(12) United States Patent
Kassler

(10) Patent No.: US 10,099,543 B2
(45) Date of Patent: Oct. 16, 2018

(54) SUNSCREEN ASSEMBLY FOR AN OPEN ROOF CONSTRUCTION

(71) Applicant: Inalfa Roof Systems Group B.V., Oostrum (NL)

(72) Inventor: Glen Kassler, Goch (DE)

(73) Assignee: INALFA ROOFING SYSTEMS GROUP B.V. (NL)

( * ) Notice: Subject to any disclaimer, the term of this patent is extended or adjusted under 35 U.S.C. 154(b) by 0 days.

(21) Appl. No.: 15/611,401

(22) Filed: Jun. 1, 2017

(65) Prior Publication Data

US 2017/0355249 A1    Dec. 14, 2017

(30) Foreign Application Priority Data

Jun. 10, 2016 (DE) .................... 20 2016 103 087 U

(51) Int. Cl.
*B60J 3/02* (2006.01)
*B60J 7/00* (2006.01)
(Continued)

(52) U.S. Cl.
CPC .......... *B60J 7/0015* (2013.01); *B60J 7/0023* (2013.01); *B60J 7/043* (2013.01); *E05D 15/06* (2013.01);
(Continued)

(58) Field of Classification Search
CPC ....... B60J 7/0015; B60J 7/0007; B60J 7/0023
(Continued)

(56) References Cited

U.S. PATENT DOCUMENTS 1,877,911 A * 9/1932 Enfant ................... A45C 11/32
206/37.4
3,953,067 A * 4/1976 Isola ................... B60R 13/0206
296/214
(Continued)

FOREIGN PATENT DOCUMENTS

DE      102012201256 A1    8/2012
EP          2338716 A1    6/2011
(Continued)

OTHER PUBLICATIONS

German Search Report for German patent application No. 202016103087.0, dated Jan. 31, 2017.

*Primary Examiner* — Dennis H Pedder

(74) *Attorney, Agent, or Firm* — Steven M. Koehler; Westman, Champlin & Koehler, P.A.

(57) ABSTRACT

Sunscreen assembly for an open roof construction in a vehicle of the type includes a flexible sunscreen having a center part and two opposed longitudinal edges connected to the center part and folding lines along which the longitudinal edges fold inwardly and whereby the center part of the flexible sunscreen comprises at least one layer of cloth. The sunscreen assembly further comprises a rotatable winding shaft configured to wind and unwind the sunscreen at a first one of its transversal edges, two opposed longitudinal guides configured to receive therein and guide corresponding ones of the inwardly folded longitudinal edges of the sunscreen, and wherein the folding lines are formed substantially by at least one respective incision made in the center part of the sunscreen along which the longitudinal edges are folded inwardly.

13 Claims, 5 Drawing Sheets

(51) Int. Cl.
  *B60J 7/043* (2006.01)
  *E05D 15/06* (2006.01)
  *E06B 9/24* (2006.01)
  *E06B 9/44* (2006.01)

(52) U.S. Cl.
  CPC ................. *E06B 9/24* (2013.01); *E06B 9/44* (2013.01); *B60J 7/00* (2013.01)

(58) Field of Classification Search
  USPC ........................................................ 296/214
  See application file for complete search history.

(56) References Cited

U.S. PATENT DOCUMENTS

| | | | | |
|---|---|---|---|---|
| 4,890,874 | A * | 1/1990 | Davis | B60R 13/01 |
| | | | | 296/39.2 |
| 6,575,527 | B1 * | 6/2003 | Bishop, Jr. | B60R 13/0212 |
| | | | | 280/751 |
| 8,366,187 | B2 * | 2/2013 | Mihashi | B60J 7/0435 |
| | | | | 296/214 |
| 2008/0115364 | A1 * | 5/2008 | Eichler | B60R 13/0225 |
| | | | | 29/897.2 |
| 2014/0333097 | A1 * | 11/2014 | Kring | B60R 13/0225 |
| | | | | 296/214 |

FOREIGN PATENT DOCUMENTS

| | | | |
|---|---|---|---|
| EP | 3017985 | A1 | 5/2016 |
| EP | 3064386 | A1 | 9/2016 |
| JP | 5634935 | B2 | 12/2014 |
| WO | 2012137716 | A1 | 10/2012 |

\* cited by examiner

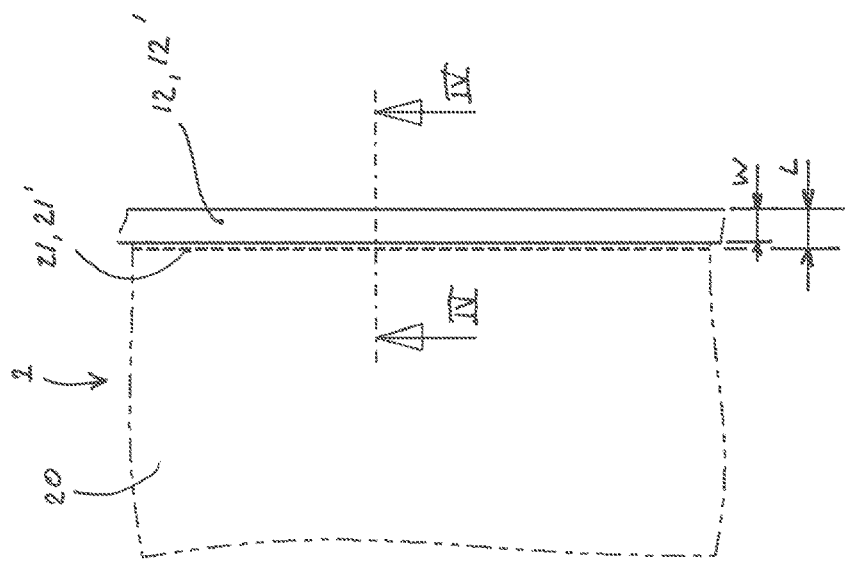
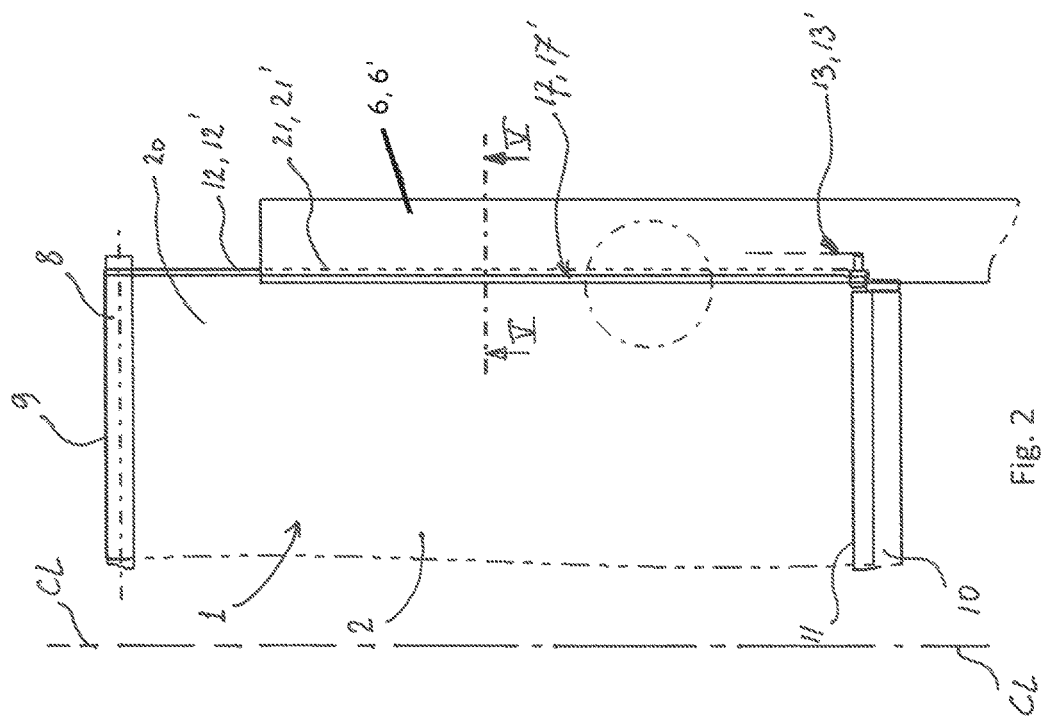

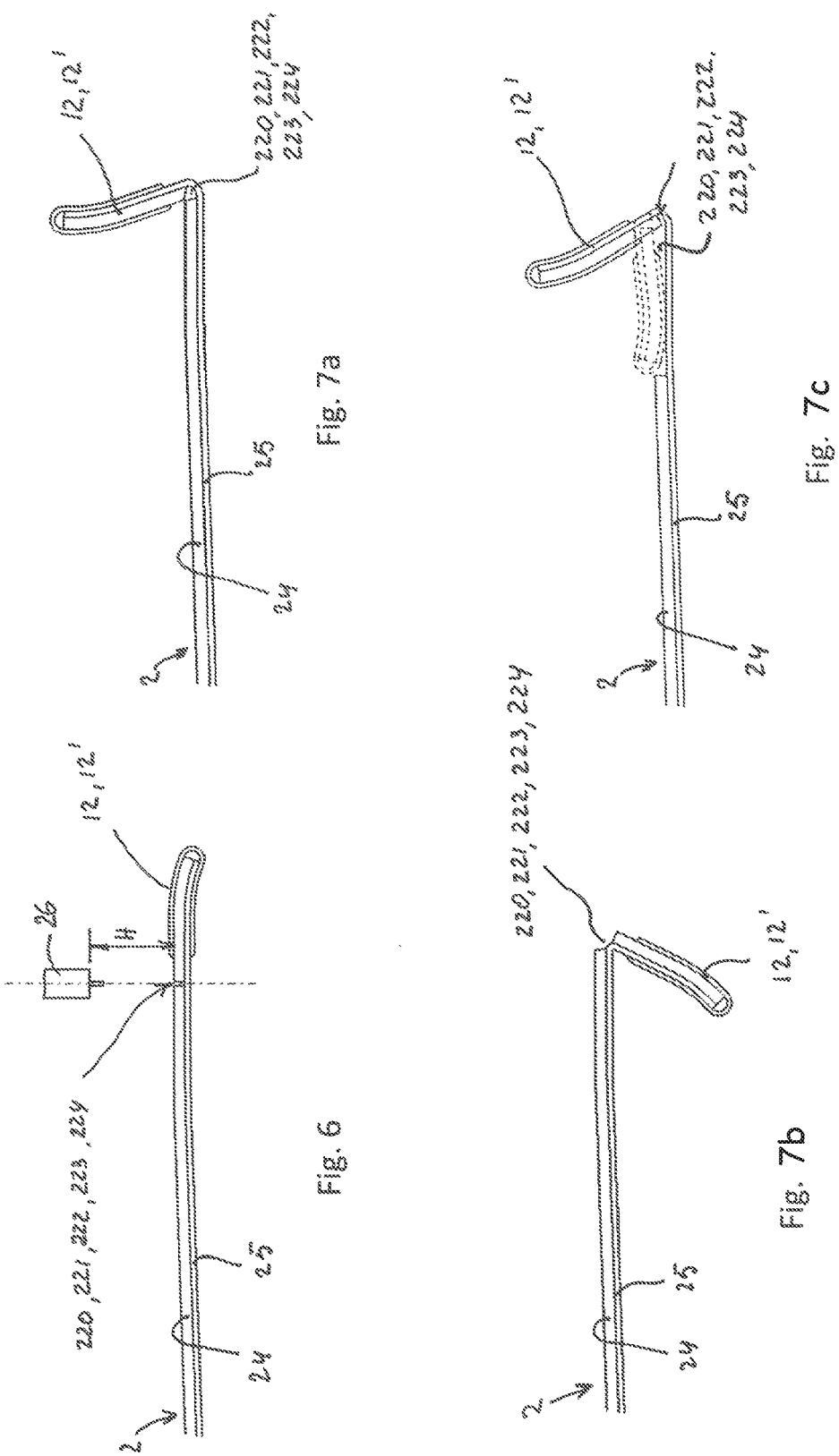

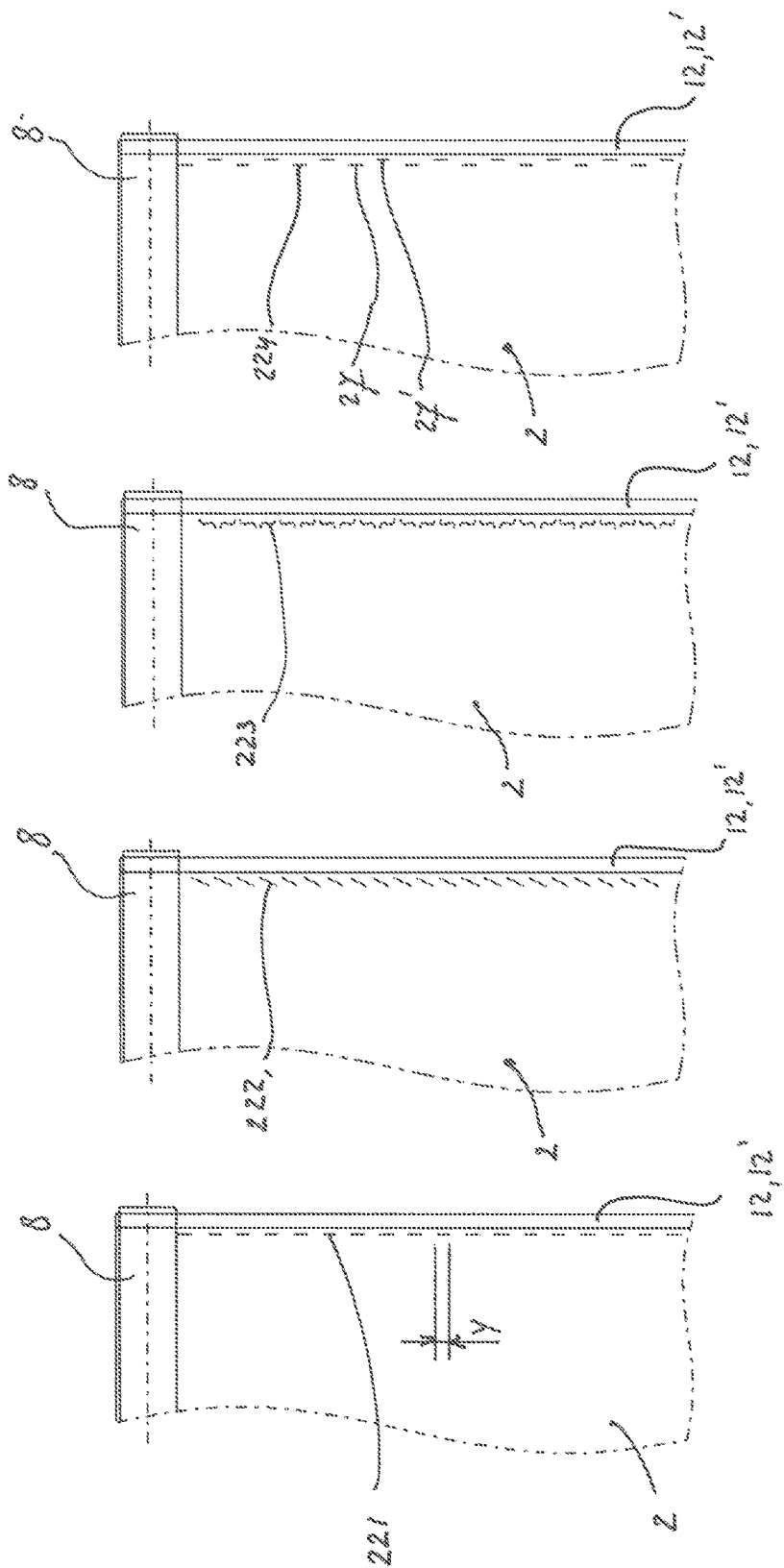

SUNSCREEN ASSEMBLY FOR AN OPEN ROOF CONSTRUCTION

BACKGROUND

The discussion below is merely provided for general background information and is not intended to be used as an aid in determining the scope of the claimed subject matter.

The invention relates to a sunscreen assembly for an open roof construction in a vehicle of the type comprising a flexible sunscreen having a center part and two opposed longitudinal edges connected to the center part and folding lines along which the longitudinal edges fold inwardly and whereby the center part of the flexible sunscreen comprises at least one layer of cloth. The sunscreen assembly further comprises a rotatable winding shaft configured for winding and unwinding the sunscreen at a first one of its transversal edges, an operating beam connected to a second one of the transversal edges of the sunscreen opposite to the first one of the transversal edges, two opposed longitudinal guides for receiving therein and guiding corresponding ones of the inwardly folded longitudinal edges of the sunscreen.

Such sunscreen assemblies are known from EP 3 017 985. Nowadays there is a tendency of having sunscreen assemblies with a flexible sunscreen which has an increased thickness, whereby often the sunscreen comprises multiple layers. In these cases it is difficult to provide for a properly defined straight folding line when the longitudinal edges of the sunscreen are folded inwardly for cooperating with the longitudinal guides. This is caused by the thickness of the sunscreen material.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Back-ground.

A sunscreen assembly disclosed herein provides folding lines that are formed substantially along at least one respective incision made in a center part of the sunscreen along which the longitudinal edges are folded inwardly.

Thus it is possible by adding an incision in the layers of the sunscreen along the line to which the longitudinal edges must be folded, to create a neat and straight folding line in the material of the sunscreen. This ensures that the sunscreen material folds exactly along the line of the incision and not in an adjacent area which would cause wrinkles in the unwounded sunscreen part or would cause an unequal winding of the sunscreen onto the winding shaft or may cause additional winding forces due to resistance to folding the longitudinal edges of the sunscreen assembly.

The designation "longitudinal" is used to indicate a direction as being parallel to the driving direction of the vehicle. The designation "inwardly" and "outwardly" is used to indicate a transverse direction directed to the center of the vehicle respectively center of the sunscreen assembly (inwardly), respectively in an opposite direction away from the center of the vehicle/sunscreen assembly (outwardly).

In one embodiment the incision is a continuous longitudinal incision extending from the first transversal edge to the second transversal edge of the sunscreen, wherein the incision is made through a complete stack of multiple layers except for a styling layer.

In this case it is an incision which does not completely cut through all of the layers of the sunscreen but leaves the styling layer intact, such that from the visible side of the sunscreen for the occupants in the vehicle the incision cannot be seen. This is advantageous in such cases where the complete stack of layers of the sunshade is rather big compared to the thickness of the styling layer alone.

In another embodiment the incision can be a discontinuous longitudinal incision extending from the first transversal edge to the second transversal edge of the sunscreen.

In this case the incision may be made either through the complete stack of the multiple of layers or only through a part of the stack of the layers of the sunscreen. This type of incision may be advantageous when the thickness of the complete stack of layers is about half of the thickness of the styling layer. In other words in those circumstances whereby incising only part of the stack of the layers and leaving the styling layer intact may not give the beneficial folding behavior, in such cases cutting discontinuous but completely through the complete stack of layers may be sufficient to reach the required folding behavior of the longitudinal edges. The areas where no incision is made will be small enough to be able to fold the longitudinal edges along a longitudinal line or area; however these areas must be strong enough to maintain the longitudinal edges attached to the center part of the sunscreen.

In yet another embodiment the incision is a discontinuous incision, whereby each incision extending in a non-longitudinal direction or such a discontinuous incision may have an "S" shape or a reversed "S" shape. As such the folding line, across which the longitudinal edges of the sunscreen will fold, will still extend in a substantial longitudinal direction however will cross these incisions. The sunscreen comprising a stack of layers may be very inelastic in any direction. It is required to have the visible part of the sunscreen taut in lateral direction, so it is important to have elasticity in the sunscreen particularly in transverse direction. To ensure that the sunscreen has enough elasticity in transverse direction especially in cases where the sunscreen has a stack of layers which are very inelastic, incisions may be made in such a way that the incisions create artificial elasticity in the sunscreen in transverse direction.

In another embodiment the incision is a discontinuous incision, and wherein the incisions extend in each of a pair of adjacent lying parallel longitudinal planes and whereby each of the following incisions extending in longitudinal direction lie intermittently in the other adjacent plane. The folding line in this embodiment can extend along the most outwardly lying plane with a first sequence of discontinuous incisions and the inwardly lying plane having a second sequence of discontinuous incisions allows for an artificial elasticity in the sunscreen in transverse direction.

In another embodiment the center part of the sunscreen comprises a multiple of layers, of which an upward layer is a backing layer and a downward layer is a styling layer. In this embodiment instead of having one layer in the center part of the sunscreen, there is a multiple of layers present, whereby the increasing thickness of the multiple of layers causes an increased thickness and an increased resistance to folding, the latter for instance due to the adhering layers between the various cloth or foil layers.

In yet another embodiment the incision is made by a mechanical cutting tool or preferably by at least one laser. The laser cutting is preferred because the depth of the incision can be easily adjusted by setting the power of the laser to a certain value. For instance cutting an incision through all of the layers of the sunscreen may require a higher power consumption of the laser than cutting only partly through the layers of the sunscreen.

In another embodiment the incision has a width (S) in the range of 0.05 to 5 mm. The width of the incision is determined by the width of the laser beam. The preferred width (S) of the incision lies in a sub range of 0.15-0.5 mm. Whereby most preferably the incision is 0.15 mm wide. Also the incision may be an incision which cuts partly through the stack of layers and may be as wide as 5 mm. This is beneficial to accommodate the longitudinal edges when folded. Depending on the thickness of the edges and the depth of the incision, the folded edges including the thickness of the remainder of the incised part of the sunscreen may have substantially the same thickness as the center part of the flexible sunscreen. In such case the sunscreen can be wound up in a controlled way such that the radial tension of the sunscreen in a wound condition is substantially the same across the complete winding shaft, causing fewer wrinkles when the sun screen is unwound from the winding shaft.

In yet another embodiment the incision is positioned in a range of 5-8 mm (L) measured from the outer edge of the longitudinal edges of the sunscreen in an unfolded condition to the outward edge of the incision. This range is determined by the width (W) of the longitudinal edges, which is nominal 5 mm, which can be chosen to be somewhat smaller or wider. The incision must lie in the edge part of the center part close to the adjacently attached longitudinal edges. A preferred distance (L) is 6 mm.

In another embodiment the incision is made such that the upper part of the incision on one end, closest to an outer edge of the backing layer, has a width bigger than the width at an opposite bottom end of the incision. This can be advantageous for the folding behavior of the longitudinal edges when the sunscreen is extremely resistant to folding for instance caused by a multiple of layers including adherence layers.

In another embodiment the longitudinal edges of the sunscreen can be folded towards the upward layer (backing layer) of the sunscreen or to the downward layer (styling layer) of the sunscreen.

BRIEF DESCRIPTION OF THE DRAWINGS

Hereinafter aspects of the invention will be elucidated while referring to the drawings in which:

FIG. 2 shows a plan view of a part of a sunscreen assembly.

FIG. 3 shows a detailed plan view of the sunscreen screen and the longitudinal edge part.

FIG. 6 shows a schematic view of the laser and part of the sunscreen.

FIGS. 7A-7C show the longitudinal edges of the sunscreen in various positions in relation to the center part of the sunscreen.

FIGS. 9-12 show a plan view of the sunscreen and various embodiments of the incision.

DETAILED DESCRIPTION

Figure 1:
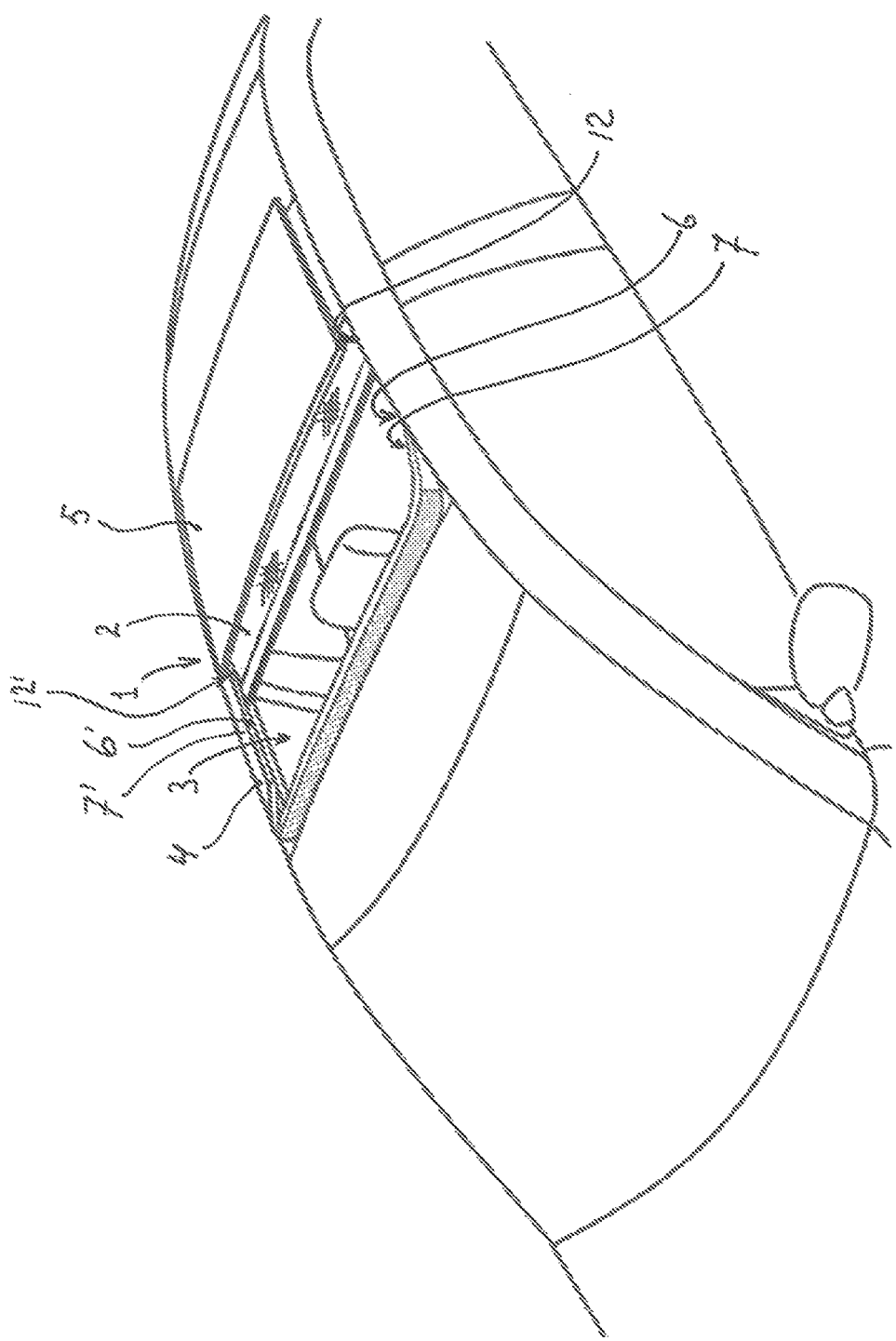
FIG. 1 shows, schematically and in perspective view, a sunscreen assembly applied to an open roof construction.

Firstly referring to FIG. 1 an example is illustrated of an open roof construction for a vehicle having a roof assembly and comprising a sunscreen assembly 1 in which a flexible sunscreen 2 may be incorporated. Said roof assembly is for opening and closing a roof opening 3 in a stationary roof part 4 of the vehicle and includes a movable closure panel 5 which, by means not illustrated in detail, but known per se, can be moved for opening and closing said roof opening 3. Commonly, as is known, the movable closure panel 5 is guided in longitudinal panel guides 6, 6' mounted in or formed in the stationary part along longitudinal sides 7, 7' of the roof opening 3. A user operated device such as an electric motor (not illustrated) is operable coupled to the closure panel 5 via cables or the like to move the closure panel 5 selectively between its open and closed conditions. In FIG. 1 the closure panel 5 has been illustrated in a position in which it opens the roof opening 3.

Below the roof opening 3 a sunscreen assembly 1 is positioned as shown in FIG. 2. Basically said sunscreen assembly 1 comprises a flexible sunscreen 2, a rotatable winding shaft 8, configured for winding and unwinding the sunscreen 2 at a first one of its transversal edges 9, an operating beam 10 connected to a second one of the transversal edges 11 of the sunscreen 2, and two opposed longitudinal guides 6, 6' for receiving therein and guiding corresponding ones of the inwardly folded longitudinal edges 12, 12' of the sunscreen 2.

The panel guides 6, 6' can be connected to or formed integral from a single unitary body with the guides 6, 6' of the closure panel 5 (not illustrated). Likewise the guides 6, 6' can be separated from the guides of the panel 5. Drive members 13, 13' may be provided, which in FIG. 2 have been illustrated schematically by dotted lines, as is known per se, the drive members 13, 13' may comprise longitudinal members driven by an actuator (not shown) for a reciprocating movement for winding and unwinding the flexible sunscreen 2.

Each drive member 13, 13' is connected to the operating beam 10 provided at the second transversal edge 11 of the sunscreen 2 opposite to the first transversal edge 9. Although the reciprocating movement of the sunscreen 2 primarily is generated by the reciprocating movement of the drive members 13 and 13' as caused by the actuator it is possible too that in addition the winding shaft 8 is preloaded in a sense for winding the sunscreen 2 thereon. Further it should be noted that the movement of the sunscreen 2 also may be initiated manually by engaging the operating beam 10. Now further reference is made to FIG. 2 which shows the sunscreen assembly 1 partly in a plan view. Only one longitudinal side is shown, however the sunscreen assembly 1 is mirror imaged over the center line CL corresponding to a vertical central plane in the vehicle as such both sides have been represented in FIGS. 2-12 by the use of both primed and unprimed reference numbers.

The sunscreen 2 is connected at a first transversal edge 9 to the winding shaft 8 and at a second transversal edge 11 to the operating beam 10. Furthermore the sunscreen 2 comprises a center part 20 and two opposed longitudinal edges 12, 12', of which only one is shown. One of the two opposed longitudinal guides 6, 6' for receiving and guiding a respective one of the longitudinal edges 12, 12' is shown. The longitudinal edges 12, 12' are folded inwardly along a folding line 21, 21' and as such are guided in a guiding channel 17, 17' as is disclosed in FIG. 5, whereby the guiding channel 17, 17' comprises an access opening 18 for the sunscreen to enter the guiding channel 17, 17' a rectangular space in which a protruding edge 16 of the channel limits the access opening 18 with respect to an opposite boundary 19 of the opening. An extreme end part 15 of the longitudinal edges 12, 12' hooks behind the protruding edge 16 of the guiding channel 17 and as such the sunscreen 2 acquires a resistance against being pulled out of the guiding channel 17, 17' by external forces. It is conceivable that the longitudinal edges 12, 12' are wound up onto the winding shaft 8 unfolded or in a folded manner. In the latter case the edges stay in a folded condition during unwinding the sunscreen 2 from the sunscreen shaft 8 into the guide channels 17,17'.

In FIG. 3 a part of the sunscreen 2 is shown with the longitudinal edge unfolded. A center part 20 of the sunscreen is shown adjacent to the unfolded longitudinal edge 12, 12'. Also a folding line 21, 21' is shown by means of an interrupted line in FIG. 3. The width (W) of the longitudinal edges 12, 12' in transverse direction can be 4 to 7 mm. Most preferably the width (W) is 5 mm. The folding line 21, 21' lies generally in a range of 5 to 8 mm (L) inward measured from the outboard edge of the longitudinal edge to the incisions 220, 221, 222, 223, 224 outward edge (e.g. FIG. 4). Most preferably it lies at a distance (L) of 6 mm from the outboard edge of the longitudinal edge to the incisions 220, 221, 222, 223, 224 outward edge. The folding line 21, 21' here is created by an incision 220, 221, 222, 223, 224 made in the center part 20 of the sunscreen 2 extending from the first transversal edge 9 to the second transversal edge 11 of the sunscreen 2. As can be seen from FIG. 4 the incision 220, 221, 222, 223, 224 is placed at a lateral edge of the center part 20 at a distance (X) of preferably 1 mm from an inward edge 23 of the longitudinal edges 12, 12'. However it is conceivable that this distance (X) lies in a range of 0-5 mm from the inward edge 23 of the longitudinal edges 12, 12'.

Figure 4:
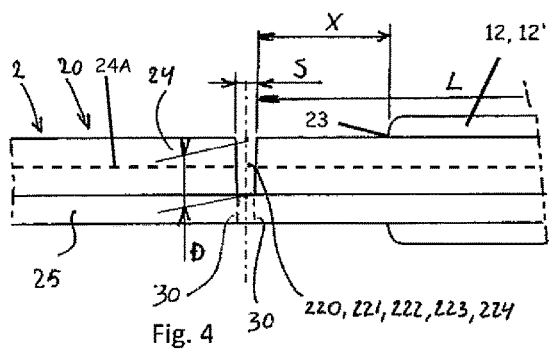
FIG. 4 shows a cross section according to IV-IV in FIG. 3.
Figure 5:
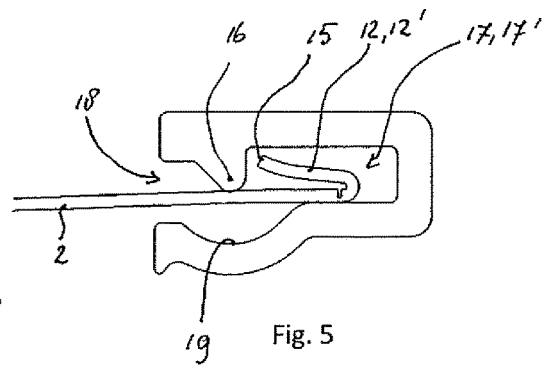
FIG. 5 shows a cross section according to V-V in FIG. 2.

In FIG. 4 a cross section according to IV-IV in FIG. 3 is shown. In this figure the sunscreen 2 is shown in an embodiment in which the center part 20 of the sunscreen comprises 2 layers, the upper layer is a backing layer 24 and the lower layer is a styling layer 25. The backing layer 24 is a technical layer for instance to provide enough thermal isolation of the sunscreen or to create less light transmission through the styling layer 25, the backing layer 24 may have a different color and or texture compared to the styling layer 25 and usually comprises less elasticity than the styling layer 25. The styling layer 25 is visible to the occupants of the vehicle and comprises the color and the texture which is adapted to the styling of the interior of the vehicle. It is conceivable that the sunscreen has just one (styling) layer with a certain thickness or comprises a multiple of layers.

In FIG. 4 the incision 220, 221, 222, 223, 224 is shown in the backing layer 24. The incision 220, 221, 222, 223, 224 in this embodiment has a depth (D) of the thickness of the backing layer 24, however it is conceivable that the depth (D) of this incision 220, 221, 222, 224 lies in the range of 10% of the total thickness of the center part 20 of the sunscreen to 100% of the thickness of the center part 20 of the sunscreen 2. In the latter case the incision 221, 222, 223, 224 goes through all of the layer(s). This has been represented schematically by two broken lines 30 in FIG. 4. The incision 220, 221, 222, 223, 224 can be made by a mechanical cutting tool, for instance a rotating cutting knife. However in a preferred embodiment the incision 220, 221, 222, 223, 224 is made by a laser beam. A laser 26 (FIG. 6) providing such a laser beam can be set to a certain power consumption, and with such a power setting the required depth of the incision 220, 221, 222, 223, 224 may be made. The width (S) of the incision is in the range of 0.05 to 8 mm, but preferably has a width (S) of 0.15 mm measured at the upper edge of the backing layer 24. The width of the incision 220, 221, 222, 223, 224 may be set by the choice of laser 26 having a certain width of the laser beam. It is also conceivable that the width for is 6 mm.

FIG. 6 shows part of the sunscreen 2 with the longitudinal edges 12, 12' in a section similar as in FIG. 4, in unfolded condition, and the incision 220, 221, 222, 223, 224 is shown in the backing layer 24 whereby the laser 26 is placed above the incision at a certain height H.

FIGS. 7a to 7c show part of sunscreen with the longitudinal edges 12, 12' folded upwardly (FIG. 7a) and downwardly (FIG. 7b). Preferably the longitudinal edges 12, 12' are folded upwardly as is known per se, but it is also conceivable that the edges 12, 12' are folded downwardly which may be advantageous when the curvature of the guides 6, 6' seen in longitudinal direction is smaller. This may occur because of the external styling of the vehicle. It may be also conceivable to have the incision 220, 221, 222, 223, 224 wider than the preferred dimension of (S) of 0.15 mm, for instance 6 mm. In this case the longitudinal edge 12, 12' may be folded inwardly and in the area where the material of the backing has been taken away may be used for placing the longitudinal edge of the sunscreen when the sunscreen 2 is wound up onto the winding shaft 8. As such the lateral edges of the sunscreen 2 where the longitudinal edges 12, 12' are folded up are not thicker than, or may have the same thickness as the thickness of the center part 20 of the sunscreen.

Figure 8:
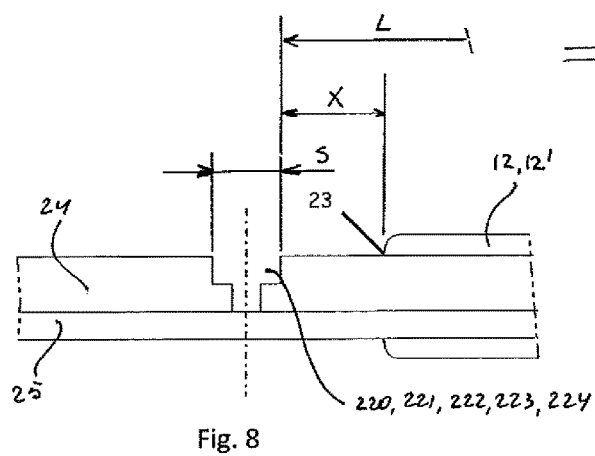
FIG. 8 shows a cross section similar like FIG. 4 with an alternative embodiment of the incision.

FIG. 8 shows a cross section similar to FIG. 4 with an alternative embodiment of the incision 220, 221, 222, 223, 224. Here the incision 220, 221, 222, 223, 224 is created in two steppes. The first step is creating the incision which extends from the upper side of the backing layer 24 to the styling layer 25, the second step is creating the incision which is less deep but is wider than the first incision. This could be done preferably by two lasers 26, 26' of different width and having each a pre-set power. The first laser 26 will cut the first deeper incision; the second laser 26' will cut the second wider incision. This process can be followed for incisions that cut through all layers or through part of the layers.

In FIG. 9-12 a number of embodiments are shown with regard to the shape of the incision 220, 221, 222, 223, 224 in longitudinal direction.

As shown in the previous embodiments the preferred incision 220 is made as a continuous incision extending from the first transversal edge 9 to the second transversal edge 11 of the sunscreen 2. In FIG. 9 a discontinuous incision 221 is shown, whereby the incision 221 extends over a distance (Y) and is followed by a distance of sunscreen 2 which is uncut after which a following incision is made and so on. This discontinuous incision 221 can be made as previously described completely through the backing layer 24 of the sunscreen 2, but it is also conceivable that the incision 221 extends only through a part of the stack of the multiple layers. For instance, the incision is made through each of multiple layers (illustrated by a dashed line 24A in FIG. 4) except for the styling layer 25. It is also conceivable that the incision 221 is created completely through all layers including the styling layer 25.

In FIGS. 10 and 11 another embodiment is disclosed where the incisions 222, 223 are discontinuous as described according to FIG. 9 but at the same time are oriented in a direction which is not longitudinal, and for instance lie under a certain angle with the longitudinal axis. Also it is conceivable that the discontinuous incisions 223 are shaped in the form of an S or a reversed S shape as shown in FIG. 11. The folding line, across which the longitudinal edges 12, 12' of the sunscreen 2 will fold, will still extend in a longitudinal direction across these incisions. In FIG. 12 the discontinuous incision 224 extends in longitudinal direction, but is made in offset to each other. Each row of discontinuous incisions is made in a separate longitudinal plane. The longitudinal planes 27, 27' are parallel to each other. The incisions are made intermittently in one of the parallel planes. The folding line in this embodiment can extend along the most outwardly lying plane with a first sequence of discontinuous incisions.

It is also conceivable that the incision patterns of the embodiments of FIGS. 9 and 10 are combined in one sunscreen.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A sunscreen assembly for an open roof construction in a vehicle of the type comprising:
    a flexible sunscreen having a center part and two opposed longitudinal edges connected to the center part and folding lines along which the longitudinal edges fold inwardly and whereby the center part of the flexible sunscreen comprises at least one layer of cloth,
    a rotatable winding shaft configured to wind and unwind the sunscreen at a first one of its transversal edges,
    an operating beam connected to a second one of the transversal edges of the sunscreen opposite to the first one of the transversal edges,
    two opposed longitudinal guides configured to receive therein and guide corresponding ones of the inwardly folded longitudinal edges of the sunscreen,
    wherein the folding lines are formed substantially by at least one respective incision made in the center part of the sunscreen along which the longitudinal edges are folded inwardly, and
    wherein the incision is a discontinuous incision comprising a succession of separate incisions and wherein successive separate incisions are longitudinally offset in one of two adjacent parallel longitudinal planes.

2. The sunscreen assembly according to claim 1, wherein the center part of the sunscreen comprises a multiple of layers of which an upward layer is a backing layer and a downward layer is a styling layer.

3. The sunscreen assembly according to claim 2, wherein the incision is made through a complete stack of the multiple of layers.

4. The sunscreen assembly according to claim 2, wherein the incision is made through each of the multiple layers except for the styling layer.

5. The sunscreen assembly according to claim 1, wherein the incision is made by a mechanical cutting tool.

6. The sunscreen assembly according to claim 1, wherein the incision is made by at least one laser.

7. The sunscreen assembly according to claim 3, wherein the incision has a width (S) in a range of 0.05 to 5 mm.

8. The sunscreen assembly according to claim 3, wherein the incision is positioned in a range of 5-8 mm (L) measured from an outer edge of the longitudinal edges of the sunscreen in an unfolded condition.

9. The sunscreen assembly according to claim 3, wherein the incision is made such that an upper part of the incision on one end, closest to an outer edge of the backing layer, has a width (S) bigger than the width at an opposite bottom end of the incision.

10. The sunscreen assembly according to claim 1, wherein the longitudinal edges of the sunscreen are able to be folded towards a backing layer of the sunscreen or to a styling layer of the sunscreen.

11. The sunscreen assembly of claim 1, wherein successive incisions of the incisions in the two adjacent parallel longitudinal planes are longitudinally spaced apart.

12. The sunscreen assembly according to claim 2, wherein the incision is made through the upward layer.

13. The sunscreen assembly according to claim 2, wherein the incision is made through a layer above the styling layer.

* * * * *